(No Model.)
M. HOYT.
PEDAL BAR FOR VELOCIPEDES.
No. 439,779. Patented Nov. 4, 1890.
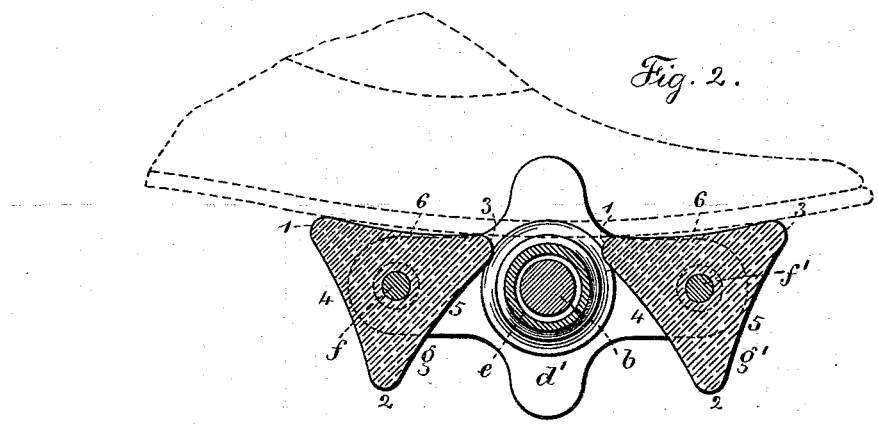
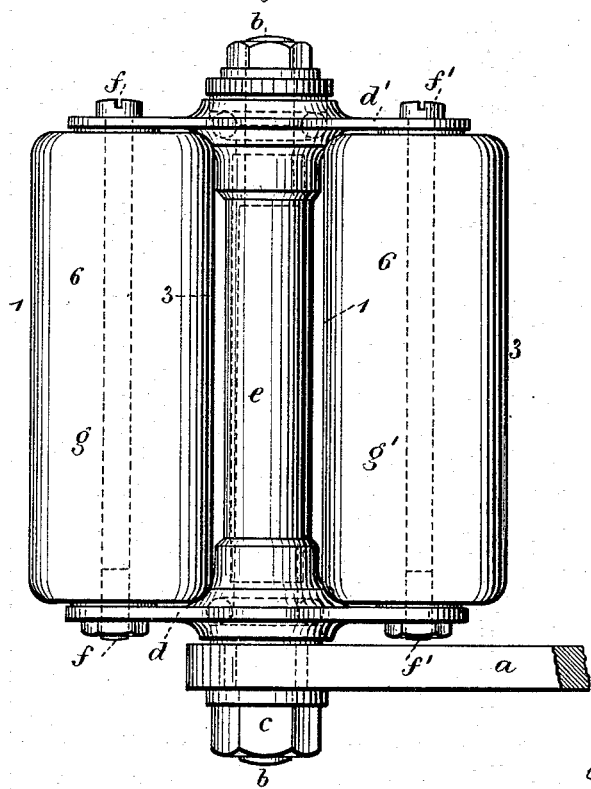
Witnesses:
J. Staib
Chas. H. Smith
Inventor:
Montraville Hoyt
per Lemuel W. Serrell, Atty.

UNITED STATES PATENT OFFICE.

MONTRAVILLE HOYT, OF JAMAICA, NEW YORK.

PEDAL-BAR FOR VELOCIPEDES.

SPECIFICATION forming part of Letters Patent No. 439,779, dated November 4, 1890.

Application filed May 12, 1890. Serial No. 351,415. (No model.)

*To all whom it may concern:*

Be it known that I, MONTRAVILLE HOYT, a citizen of the United States residing at Jamaica, in the county of Queens and State of New York, have invented a new and useful Improvement in Rubber Bearing-Bars for Velocipede-Pedals, of which the following is a specification.

The rubber bearing-bars of velocipede-pedals have been made of various shapes—such as round and corrugated, square with a ribbed surface parabolically curved in cross-section, of four equal figures with four points—and said pedal-rubber bars have been made rotatable upon their shaft, so that in use the upper bearing surfaces conform to the curve of the foot of the rider of the velocipede.

My invention relates to a pedal-rubber or bearing bar that is rotatable upon its axis to conform to the curve of the foot, and the same is a new article of manufacture and consists of a pedal-rubber or bearing bar of triangular shape in cross-section having three edges rounded and three bearing-faces, preferably slightly concaved. This pedal-rubber or bearing bar provides as great bearing-surfaces as pedal-rubbers of other shapes, but from its triangular form does not contain as much rubber, and is consequently of lighter weight.

In the drawings, Fig. 1 is a plan view of a velocipede-pedal having my improved rubber bars, and Fig. 2 is a cross-section of the same.

$a$ represents the crank, $b$ the pedal-shaft, and $c$ its connecting and clamping nut.

$d\ d'$ represent the end disks of the pedal, and $e$ its tubular shaft.

$f\ f'$ represent the pins or shafts for the rotatable bearing-bars $g\ g'$ of rubber.

The rubber bearing-bars $g\ g'$ are of triangular shape in cross-section, having three edges 1 2 3, that are preferably slightly rounded, and three bearing-faces 4 5 6, that are preferably slightly concaved, and said rubber bars are frictionally held in place upon their pins or shafts $f\ f'$, but are free to be rotated by the hand or to be slightly turned by the pressure of the foot of the rider to conform to the curve of the foot, as is illustrated in Fig. 2.

Where the bearing-surface of my triangular bar is the same as that of a square bar, less rubber is used in making the triangular form than the square form, and there is consequently less weight, which is a desirable item, and where a like amount of rubber be employed in the triangular bar as is employed in the square bar then a triangular bar of greater bearing-surface can be produced, which is also a desirable feature for velocipedes in which lightness is not specially sought.

I claim as my invention—

As a new article of manufacture, a rubber bearing-bar for velocipede-pedals of triangular form in cross-section and having three rounded edges and three slightly-concave bearing-faces, substantially as set forth.

Signed by me this 5th day of May, A. D. 1890.

MONTRAVILLE HOYT.

Witnesses:
GEO. T. PINCKNEY,
D. HOPNER.